United States Patent
Figovsky et al.

(10) Patent No.: US 9,648,121 B2
(45) Date of Patent: May 9, 2017

(54) SOURCE-DESTINATION NETWORK ADDRESS TRANSLATION (SDNAT) PROXY AND METHOD THEREOF

(71) Applicant: Ravello Systems Ltd., Raanana (IL)

(72) Inventors: Boris Figovsky, Hadera (IL); Alexander Fishman, Raanana (IL)

(73) Assignee: Ravello Systems Ltd., Redwood Shores, CA (US)

( * ) Notice: Subject to any disclaimer, the term of this patent is extended or adjusted under 35 U.S.C. 154(b) by 162 days.

(21) Appl. No.: 14/722,441

(22) Filed: May 27, 2015

(65) Prior Publication Data

US 2015/0350157 A1    Dec. 3, 2015

Related U.S. Application Data

(60) Provisional application No. 62/003,032, filed on May 27, 2014.

(51) Int. Cl.
*G06F 15/16* (2006.01)
*H04L 29/08* (2006.01)
*G06F 9/455* (2006.01)
*H04L 29/12* (2006.01)

(52) U.S. Cl.
CPC .......... *H04L 67/28* (2013.01); *G06F 9/45558* (2013.01); *H04L 61/2528* (2013.01); *G06F 2009/45595* (2013.01); *H04L 61/6068* (2013.01)

(58) Field of Classification Search
CPC . H04L 67/28; H04L 61/2528; H04L 61/6068; G06F 2009/45595
See application file for complete search history.

(56) References Cited

U.S. PATENT DOCUMENTS

| 7,228,337 | B1 | 6/2007 | Bornstein et al. | |
|---|---|---|---|---|
| 7,760,729 | B2 * | 7/2010 | Srisuresh | G06F 15/16 370/392 |
| 8,194,673 | B2 * | 6/2012 | Srisuresh | G06F 15/16 370/392 |
| 8,194,674 | B1 | 6/2012 | Pagel et al. | |
| 8,224,971 | B1 | 7/2012 | Miller et al. | |
| 8,396,986 | B2 * | 3/2013 | Kanada | G06F 9/4856 709/238 |
| 8,601,158 | B2 | 12/2013 | Holland et al. | |
| 8,627,310 | B2 | 1/2014 | Ashok et al. | |
| 8,634,437 | B2 | 1/2014 | Wu | |
| 8,650,299 | B1 | 2/2014 | Huang et al. | |

(Continued)

*Primary Examiner* — Moustafa M Meky
(74) *Attorney, Agent, or Firm* — Invoke

(57) ABSTRACT

A proxy and method for performing source destination network address translation are presented. The method includes receiving a first message from a node communicatively connected to a first network to access a resource communicatively connected to a second network, wherein the first message contains at least a source address and a destination address used within the first network; translating the destination address designated in the first message to an address of the resource; generating a unique address for the destination address designated in the first message, wherein the unique address is an address not in use on the second network; providing a translated message including the translated destination address and the unique address; and forwarding the translated message to the resource communicatively connected to the second network.

17 Claims, 4 Drawing Sheets

(56) References Cited

U.S. PATENT DOCUMENTS

| | | | |
|---|---|---|---|
| 8,909,780 B1* | 12/2014 | Dickinson | G06F 9/45533 |
| | | | 709/220 |
| 8,958,293 B1* | 2/2015 | Anderson | H04L 67/1002 |
| | | | 370/230 |
| 9,042,884 B1* | 5/2015 | Faccin | H04W 8/04 |
| | | | 455/432.1 |
| 9,413,719 B2* | 8/2016 | Litvin | H04L 29/12584 |
| 2010/0251335 A1* | 9/2010 | Srisuresh | G06F 15/16 |
| | | | 726/3 |
| 2010/0287548 A1* | 11/2010 | Zhou | G06F 9/4856 |
| | | | 718/1 |
| 2011/0246669 A1* | 10/2011 | Kanada | G06F 9/4856 |
| | | | 709/238 |
| 2013/0041987 A1 | 2/2013 | Warno | |
| 2013/0047151 A1 | 2/2013 | Sridharan et al. | |
| 2013/0151661 A1 | 6/2013 | Koponen et al. | |
| 2013/0227303 A1* | 8/2013 | Kadatch | G06F 21/554 |
| | | | 713/193 |
| 2014/0108665 A1* | 4/2014 | Arora | H04L 67/141 |
| | | | 709/227 |

\* cited by examiner

US 9,648,121 B2

SOURCE-DESTINATION NETWORK ADDRESS TRANSLATION (SDNAT) PROXY AND METHOD THEREOF

CROSS-REFERENCE TO RELATED APPLICATIONS

This application claims the benefit of U.S. provisional application No. 62/003,032 filed on May 27, 2014, the contents of which are hereby incorporated by reference.

TECHNICAL FIELD

The disclosed embodiments generally relate to virtual machines (VMs), and more specifically to VMs operating within a virtual environment and configured to respond to access from external sources connected in an external network.

BACKGROUND

Virtual machines (VMs) are increasingly used in a plurality of different applications. The VMs operate in a VM environment and typically are hosted on physical computing machines. Typically, to interconnect between the VMs there is a virtual network, which is configured to allow the VMs to communicate with each other. The VMs may be computing machines, storage machines, databases, and more, all being virtualized in the VM environment. The virtual network enables the VMs to communicate with each other. For example, a VM which operates as a server, may access another VM which operates as a database for reading, writing, and modifying data therein.

In typical applications there is also a need to operate outside of this virtual environment, that is, allow access to and from the VMs. For example, a user device on the Internet may wish to communicate with a server executing VM. For that purpose, the server is configured to have a network (e.g., Internet) access and using a network address translation (NAT) it is possible for the user device to communicate with the server in the VM environment. However, it may not necessarily be desirable to allow all components of the VM environment to have Internet access. For example, a VM database component may be configured not to have Internet access. For that matter, the user device, when needing to access the VM database, communicates with the VM server and the VM database over the virtual network connected in between. As a result, the user device cannot connect directly with the VM database from an external network. The external network which may become a challenge in case there is a need to access a VM component not having Internet or, for that matter, external access. However, there are cases where such external access by a VM component is desirable, for example, for the purpose of maintenance. The operation of the current state-of-the-art NAT does not provide support for such capability Therefore, in order to overcome the deficiency of the prior art, it would be further advantageous to provide a solution that allows VM components access to an external network.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a source-destination network address translation (SDNAT) proxy. The proxy comprises a processing system; a memory, the memory containing instructions that, when executed by the processing unit, configure the SDNAT proxy to: receive a first message from a node communicatively connected to a first network to access a resource communicatively connected to a second network, wherein the first message contains at least a source address and a destination address used within the first network; translate the destination address designated in the first message to an address of the resource; generate a unique address for the destination address designated in the first message, wherein the unique address is an address not in use on the second network; provide a translated message including the translated destination address and the unique address; and forward the translated message to the resource communicatively connected to the second network.

Certain embodiments disclosed herein also include a method for performing source destination network address translation. The method comprises receiving a first message from a node communicatively connected to a first network to access a resource communicatively connected to a second network, wherein the first message contains at least a source address and a destination address used within the first network; translating the destination address designated in the first message to an address of the resource; generating a unique address for the destination address designated in the first message, wherein the unique address is an address not in use on the second network; providing a translated message including the translated destination address and the unique address; and forwarding the translated message to the resource communicatively connected to the second network.

BRIEF DESCRIPTION OF THE DRAWINGS

The subject matter that disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
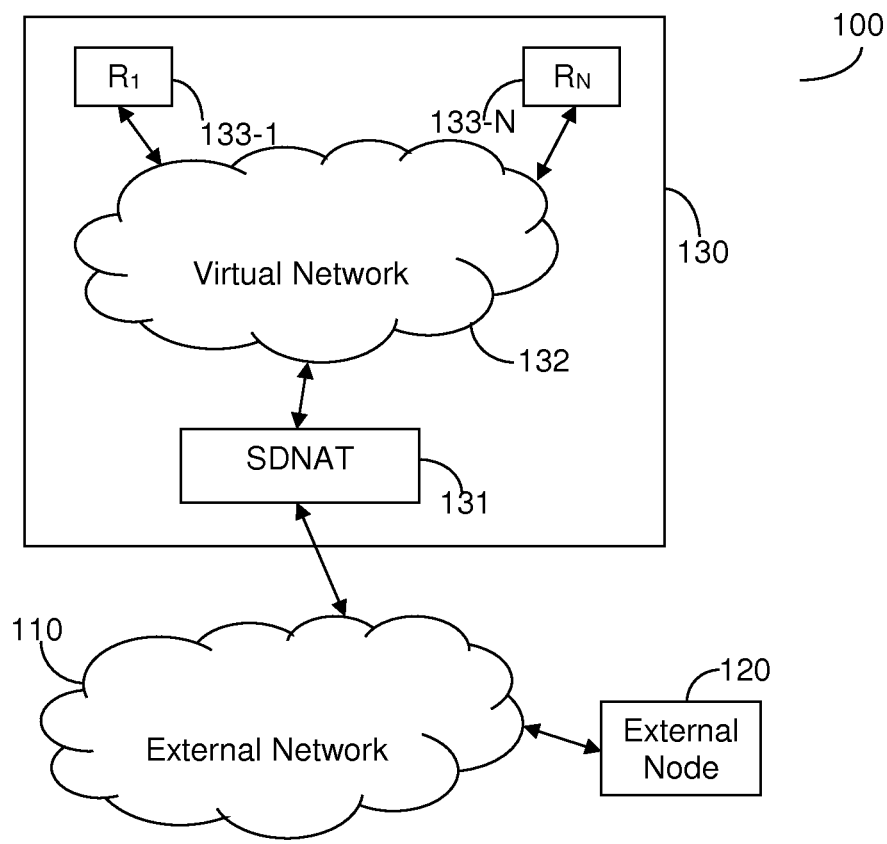
FIG. 1 is a schematic diagram of a virtual machine (VM) environment with a source-destination network translation (SDNAT) proxy according to an embodiment.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Various exemplary embodiments disclosed herein include a method and a proxy configured to perform both destination network address translation (NAT) and source NAT (hereinafter "SDNAT"). By a way of example, an external device sends a packet to a virtual machine (VM), that otherwise cannot access the Internet, using the VM's known IP address.

In an embodiment, the SDNAT translates both the source and the destination IP addresses to meet the requirements of the private virtual network by selecting a source address not being used by that subnet and mapping it to the external device internally. The VM can then respond using these translated addresses. Then, the SDNAT performs a reverse translation to modify the translated IP addresses to fit the external network. Accordingly, the VM can now access the Internet responsive of the received packet without being able to otherwise perform Internet accesses.

FIG. 1 shows an exemplary and non-limiting schematic diagram of a network system 100 utilized to describe some of the disclosed embodiments. The network system 100 includes a virtual machine (VM) environment 130 communicatively connected to a SDNAT proxy 131 configured to provide address translation services of addresses. The SDNAT proxy 131 is connected to a virtual network 132 and in addition to an external network 110. Hence, communication to and from the VM environment 130 is performed by using the SDNAT proxy 131.

To the virtual network 132 there are connected a plurality of resources 133-1 through 133-N (where N is an integer equal to '1' or greater). Each of the resources $R_1$ 133-1 through $R_N$ 133-N is a virtual machine component, such as a server, a database, a storage device, and the like, which are defined as part of the VM environment 130. In addition, each of the resources $R_1$ 133-1 through $R_N$ 133-N, may or may not be configured to perform communication over the external network 110. That is, for example, a resource $R_1$ 133-1 may be a server that is configured to communicate on both the virtual network 132 as well as on the external network 110. Another resource, for example resource $R_N$ 133-N may be a database with no need to have the ability to access the external network 110 and therefore is configured to access only the virtual network 132.

The external network 110 may be a local area network (LAN), a wide area network (WAN), a metro area network (WAN), the Internet, the worldwide web (WWW), and other like networks, wired or wireless, including cellular, and in any possible combination. An external node 120 communicatively connected to the external network 110 may access any of the resources $R_1$ 133-1 through $R_N$ 133-N, and vice versa. The external node 120 may be a server, a personal computer (PC), a notebook computer, a tablet computer, a mobile phone, and other platforms that have access either wired or wirelessly, and that are configured to operate with respect of the VM environment 130 over the external network 110.

According to the disclosed embodiment, the SDNAT proxy 131 is configured to enable the connection between the external node 120 to any of the resources $R_1$ 133-1 through $R_N$ 133-N, and vice versa. In particular, such communication is enabled when the resources 133-1 through 133-N are not configured to access the external network 110. As will be discussed in more detail below, the SDNAT proxy 131 receives a packet sent by the external node 120 originated to the VM 130. The SDNAT proxy 131 translates both the source and the destination IP addresses to meet the requirements of the virtual network 132 by selecting a source address not being used by a subnet of the virtual network 132. Then, the SDNAT proxy 131 is configured to internally map the selected source address to the external node 120. Then, a resource 133 can then respond using the translated addresses. Then, the SDNAT proxy 131 performs a reverse translation to modify the translated IP addresses to fit the external network 110. Accordingly, responsive of the received packet, a resource 133 can access the external node 120 through the external network 110.

In an embodiment, the SDNAT proxy 131 may be realized a virtual machine, a software agent installed in the VM environment 130, a physical appliance, or any combination thereof. The VM environment 130 and/or the SDNAT proxy 131 may be also realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 2:
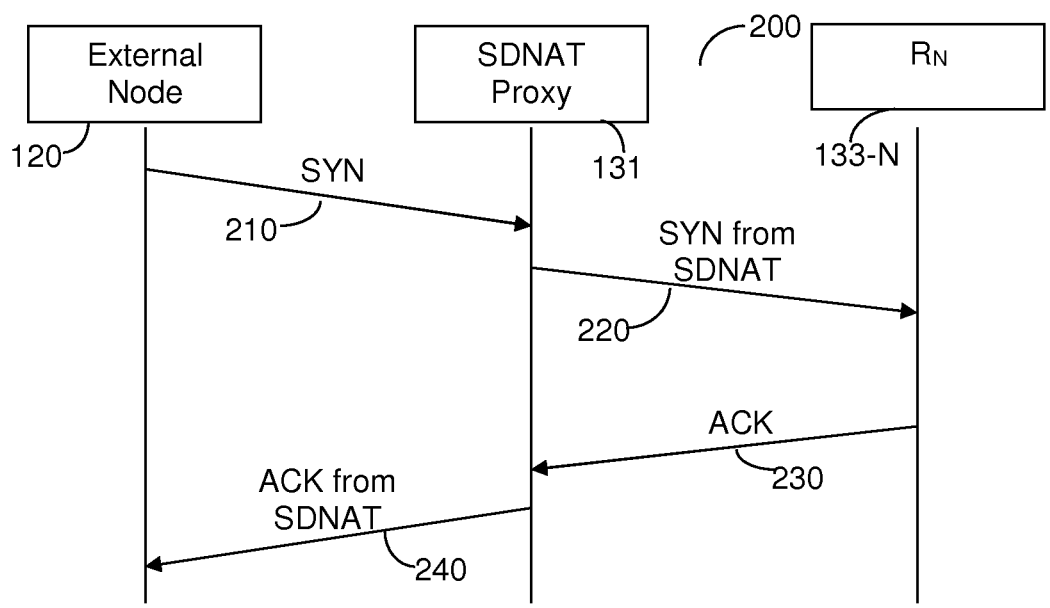
FIG. 2 is a communication diagram illustrating a source to destination network translation according to an embodiment.

FIG. 2 shows an exemplary and non-limiting communication diagram 200 illustrating the operation of the of the SDNAT proxy 131 according to an embodiment. In this example, the external node 120 attempts to perform a communication with $R_N$ 133-N, where $R_N$ 133-N is configured not to have access to the external network 110. It should be noted that the external node 120 is provided with an IP address for communication with $R_N$ 133-N, such as an IP address of the $R_N$ 133-N.

The communication diagram 200 concentrates only on a SYN packet from the external node 120 and the ACK message from the resource $R_N$ 133-N. As illustrated in FIG. 2, a SYN packet 210 is sent from the external node 120 and reaches the SDNAT proxy 131. The SYN packet includes in its header a source and destination IP address.

Analyzing the IP addresses, the SDNAT proxy 131 is configured to perform both source and destination address translation. The SDNAT proxy 131 further maintains in its memory (not shown) a map of the addresses' translation. While the resource $R_N$ 133-N has by configuration an IP address to be used on the virtual network 132, such an address does not exist for the source, in this case the external node 120. Therefore, such an address is generated by the SDNAT proxy 131 with a mapping that allows translation from the external address of the external node 120 to its respective virtual internal address.

Now, a SYN packet 220 having the translated addresses is sent to the resource $R_N$ 133-N. The resource $R_N$ 133-N responds to the SDNAT proxy 131 with an ACK packet 230 using the translated addresses. That is, the ACK packet is sent to a translated source IP addressed designated in the SYN packet. The ACK packet 230 is a valid, because the resource $R_N$ 133-N performs an internal communication over the virtual network 132 without performing, or attempting to perform, an external access.

The SDNAT proxy 131 is further configured to identify the destination address designated in the ACK packet 230 as an address directed to an external destination. Then, the SDNAT proxy 131 performs a translation to an IP address of the external node 120, as well as a translation of the address of the source, in this case the resource $R_N$ 133-N.

Then, the SDNAT proxy 131 is configured to send a translated ACK packet 240 to the external node 120. That is, the destination address in the packet 240 is a translated address of the destination address included in the ACK packet 230. Therefore, the SDNAT proxy 131 is configured to perform both source address translations and destination address translations.

It should be further noted that although not illustrated in FIG. 2, according to the disclosed embodiments, the initiation of such a communication transaction may only begin from an external node, for example the external node 120, having the IP address of a VM resource, for example a resource $R_N$ 133-N, thereby avoiding accidental access by a VM resource not configured to have external network access.

Figure 3:
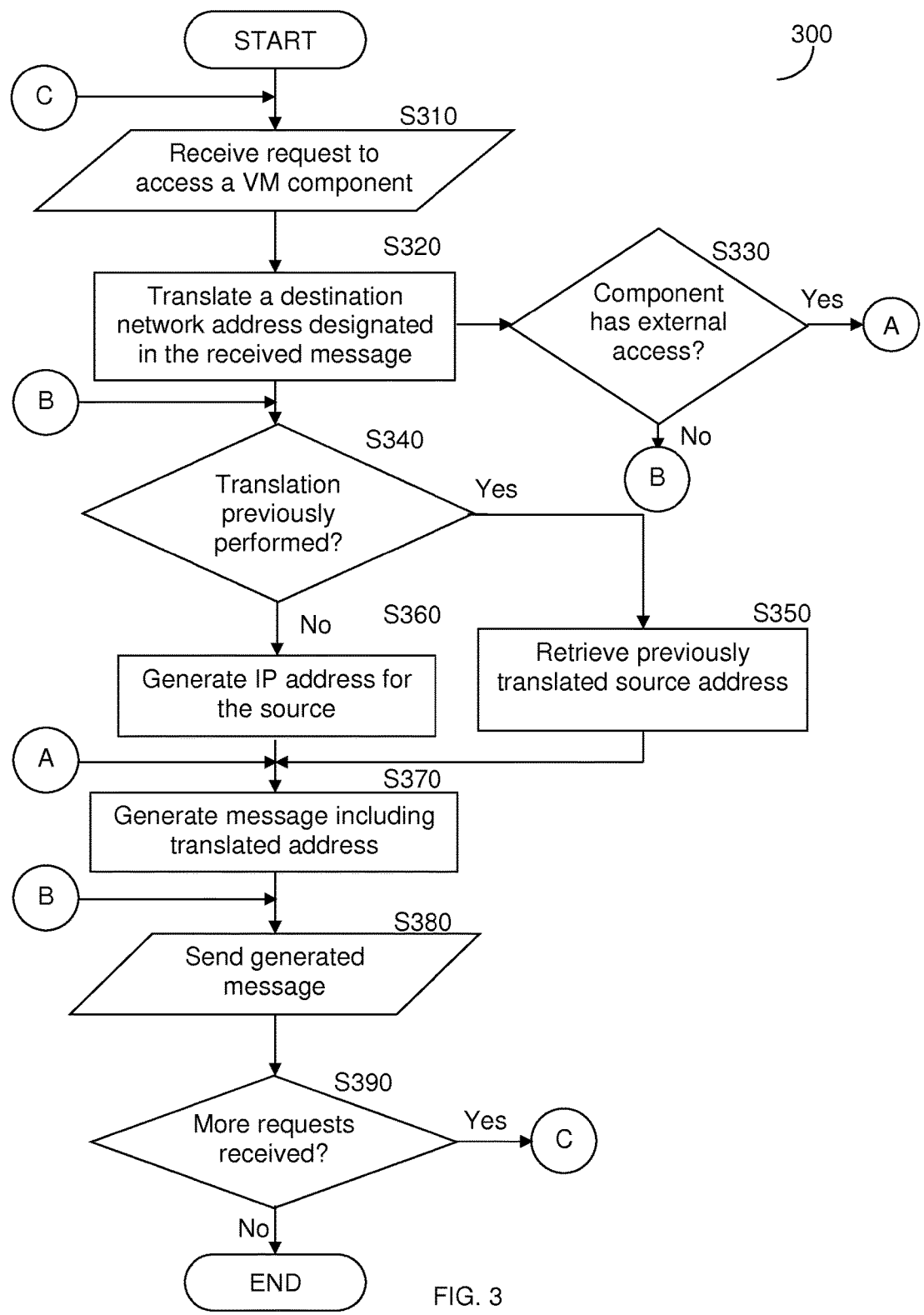
FIG. 3 is a flowchart of the operation of the SDNAT responsive to an incoming communication request received from an external network according to an embodiment.

FIG. 3 depicts an exemplary and non-limiting flowchart 300 of the operation of the SDNAT proxy 131 responsive to an incoming communication request according to an embodiment. An incoming communication request is received from an external network, e.g., external node 120, to access a destination VM component or resource, e.g., $R_N$ 133-N. The destination VM component or resource does not have an access to the external network, e.g., network 110.

In S310, an incoming request to access a VM component in the VM environment is received from an external node. In an embodiment, such as a request may be a TCP SYN packet.

In S320, a destination network address designated in the received message is translated to a network address of the VM component having external network access In an optional S330, it is checked whether the destination VM component has access to the external network, and if so, execution continues with S370; otherwise, execution continues with S340. The check may be performed by analyzing the configuration and/or settings of the VM component. Alternatively, a ping request may be sent from VM component to the external network. In an embodiment, the translated network address is an IP address.

In S340, it is checked whether an address translation for the source address designated in the received message has been previously performed and stored in a memory of the SDNAT proxy 131. If so, execution continues with S350, where a previously translated source address is retrieved from memory respective of the source IP address, and execution continues with S370. If S340 results with a 'No' answer, execution continues with S360.

In S360, an IP address is generated for the source (i.e., external node) to be used as the virtual network IP address for the external node. The generated IP address is utilized by the VM component to allow access to the external network. The generated IP address is selected so that it does not conflict with any other addresses used by any VM component in the VM environment. In an embodiment, a random IP address is randomly selected from a range (or subnet) of IP addresses not in used, and then checked if the selected IP address is unique. The source IP addresses generated to access the external network may be saved in a memory of the SDNAT proxy and used for subsequent incoming communication requests.

In S370, a message including the translated destination address or optionally the translated source address is generated. In an embodiment, the message is in a format of TCP SYN packet. In S380, the generated message is sent to the destination, i.e., the VM component. In S390, it is checked whether additional requests are received, and if so execution continues with S310; otherwise, execution terminates.

Figure 4:
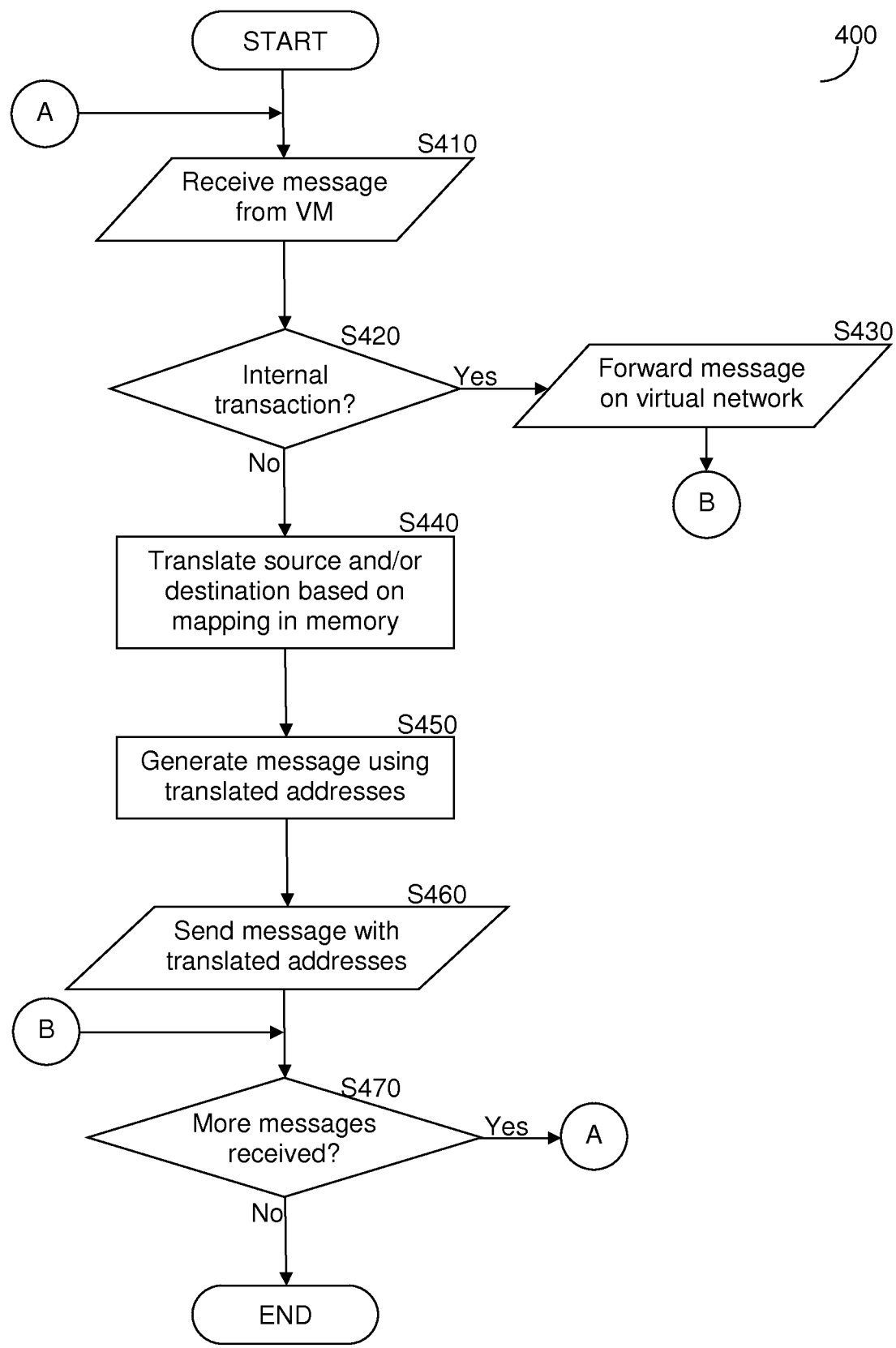
FIG. 4 is a flowchart of the operation of the SDNAT responsive to an outgoing communication request to access an external network according to an embodiment.

FIG. 4 shows an exemplary and non-limiting flowchart 400 of the operation of the SDNAT proxy 131 responsive to an outgoing communication request according to one embodiment. The outgoing communication request is issued by VM component or resource (e.g., $R_N$ 133-N) to access an external node over an external network. The VM component does not have an access to the external network 120.

In S410, an outgoing communication request (message) is received from a VM component over the virtual network. Such a request may be a TCP SYN packet. In S420, it is checked whether the request is internal to the VM environment, that is, if the request is directed to another VM component. If so, execution continues with S430; otherwise, execution continues with S440. In S430, the message is transparently forwarded to the VM component designated in the received request as no address translation is needed and execution then continues with S470. It should be noted that from a practical perspective S430 is optional and may not be required, as all VM components connected to the virtual network receive such a request (e.g., TCP SYN) and ignore packets not destined to them. Hence, it should be understood that this description is illustrative to the operation.

In S440, the address translations are performed. In an embodiment, S440 may include destination IP address translation, source IP address translation, or translation of both source and destination IP addresses. The translation performed in S440 is directed at creating a mapping between internal addresses to the VM environment and the external addresses for the external network. In an embodiment, a destination IP address is generated for the external node. Such an IP address is utilized by the VM component to allow access to the external network. The generated destination IP address is selected so that it does not conflict with any other addresses used by any VM component in the VM environment. In an embodiment, a random IP address is randomly selected from a range (or subnet) of IP addresses not in use, and then checked to determine if the selected IP address is unique. The IP addresses generated to access the external network may be saved in a memory of the SDNAT proxy and used for subsequent outgoing communication requests.

In S450, the message is generated with the translated addresses (provided at S440). In an embodiment, the message is in a format of a TCP SYN packet. In S460, the message is sent to the external node over the external network. In S470, it is checked whether additional messages are to be handled, and if so, execution continues with S410; otherwise, execution terminates.

The embodiments disclosed herein are not limited to virtual machines. According to some embodiments, the SDNAT proxy and the address translation techniques disclosed herein may be applicable in a network system enabling address translations between two different networks, e.g., a first network and a second network.

The first network has a first node communicatively connected thereto and is configured to send at least a message to a second node communicatively connected to the second network. Sending such a message requires the translation of the destination node address, i.e., the address of the second node, from the address used by the first node to communicate over the first network, to an address usable on the second network. The second node is configured without having access to the first network. As a result, according to some embodiments, in order to enable communication between the nodes, a source address translation takes place by the SDNAT proxy.

To this end, the SDNAT proxy is configured to select an address not used with respect of the second network and map the source address provided for the first node on the first network, to a unique address to be used on the second network. This allows the second node to respond to the message received from the first node using the translated unique address used for the first node on the second network. Furthermore, when the SDNAT proxy is configured to identify the unique address, such address is being translated to the addresses of the message using the unique address as a pointer to a map in memory managed by the SDNAT proxy. The SDNAT proxy is further configured to translate back the address of the first node to an address recognized on the first network.

The embodiments disclosed herein can be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units or processing elements, including virtual processing elements, ("CPUs"), a memory, and input/output interfaces. The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A source-destination network address translation (SDNAT) proxy comprising:
   a processing system;
   a memory, the memory containing instructions that, when executed by the processing system, configure the SDNAT proxy to:
   receive a first message from a node communicatively connected to a first network to access a resource communicatively connected to a second network, wherein the first message contains at least a source address and a destination address used within the first network;
   translate the destination address designated in the first message to an address of the resource;
   generate a unique address for the source address designated in the first message, wherein the unique address is an address not in use on the second network;
   provide a translated message including the translated destination address and the unique address; and
   forward the translated message to the resource communicatively connected to the second network.

2. The SDNAT proxy of claim 1, wherein the memory contains a map for translation of the destination address.

3. The SDNAT proxy of claim 1, further configured to:
   identify whether the resource is capable of communicating with the node over the first network; and
   upon determination that the resource is not configured for communication over the first network, generate the unique address.

4. The SDNAT proxy of claim 1, further configured to:
   save in the memory a mapping between the source address and the unique address.

5. The SDNAT proxy of claim 1, wherein the second network is a virtual network and the resource is a virtual machine (VM) component, wherein the VM component and the virtual network are part of a VM environment.

6. The SDNAT proxy of claim 5, wherein the SDNAT proxy is connected in the VM environment.

7. The SDNAT proxy of claim 5, wherein the first network is external to the VM environment.

8. The SDNAT proxy of claim 1, further configured to:
   receive a response message from the resource on the second network, wherein the response message includes a resource source address of the resource on the second network and the unique address.

9. The SDNAT proxy of claim 8, further configured to:
   translate the unique address, from the response message, to a node destination address of the node on the first network;
   translate the source address of the resource on the second network to (a) the destination address included in the first message;
   generating a translated response message including (a) the node destination address of the node on the first network as a destination address for the translated response message and (b) the destination address in the first message as a source address for the translated response message;
   send the translated response message to the node on the first network.

10. A method for performing source destination network address translation, comprising:

receiving a first message from a node communicatively connected to a first network to access a resource communicatively connected to a second network, wherein the first message contains at least a source address and a destination address used within the first network;

translating the destination address designated in the first message to an address of the resource;

generating a unique address for the source address designated in the first message, wherein the unique address is an address not in use on the second network;

providing a translated message including the translated destination address and the unique address; and forwarding the translated message to the resource communicatively connected to the second network.

11. The method of claim 10, further comprising:

identifying whether the resource is capable of communicating with the node over the first network; and upon determination that the resource is not configured for communication over the first network, generating the unique address.

12. The method of claim 10, further comprising:

saving in a memory a mapping between the source address and the unique address, wherein the memory contains a map for translation of the destination address.

13. The method of claim 10, wherein the second network is a virtual network and the resource is a virtual machine (VM) component, wherein the VM component and the virtual network are part of a VM environment.

14. The method of claim 13, wherein the method is performed by a SDNAT proxy connected in the VM environment.

15. The method of claim 13, wherein the first network is external to the VM environment.

16. The method of claim 10, further comprising:

receiving a response message from the resource on the second network, wherein the response message includes a resource source address of the resource on the second network and the unique address.

17. The method of claim 16, further comprising:

translating the unique address, from the response message, to a node destination address of the node on the first network;

translating the source address of the resource on the second network to (a) the destination address included in the first message;

generating a translated response message including (a) the node destination address of the node on the first network as a destination address for the translated response message and (b) the destination address in the first message as a source address for the translated response message;

sending the translated response message to the node on the first network.

* * * * *